United States Patent Office 3,572,355
Patented Mar. 23, 1971

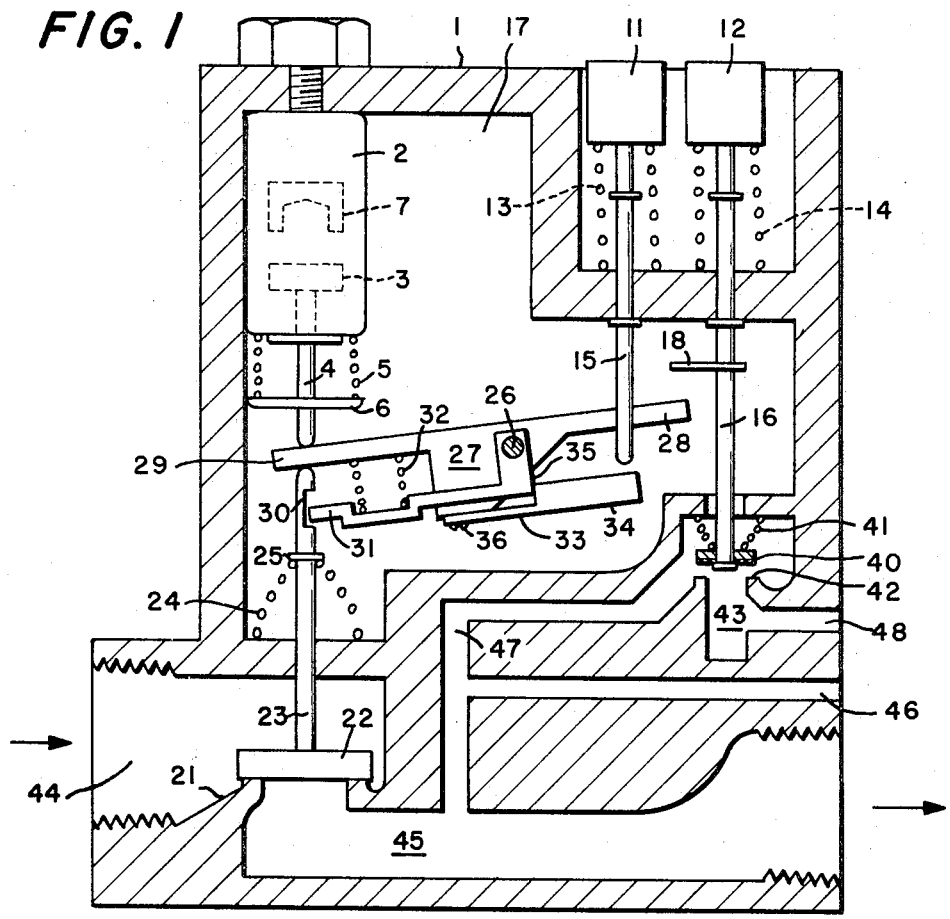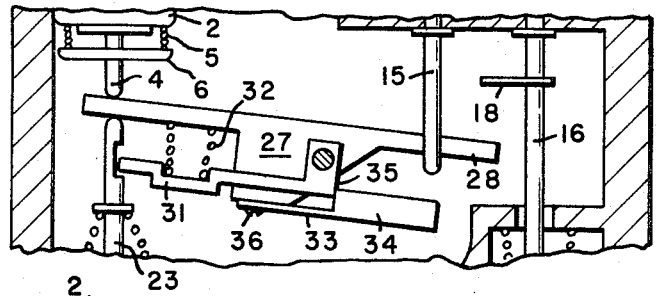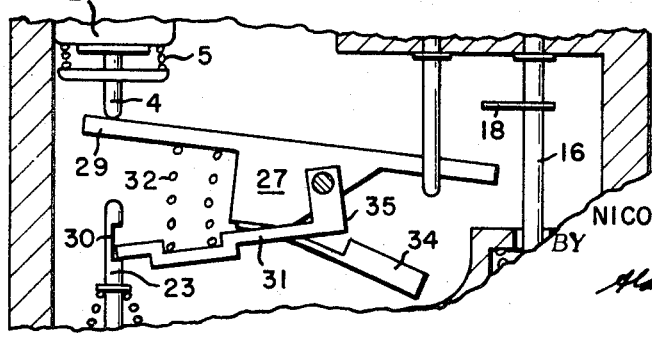

3,572,355
PUSHBUTTON OPERABLE GAS VALVE COMBINATION
Nico Van der Linden, Emmen, Netherlands, assignor to Honeywell Inc., Minneapolis, Minn.
Filed Dec. 13, 1968, Ser. No. 783,679
Claims priority, application Germany, Mar. 30, 1968,
P 17 78 129.2
Int. Cl. F23n 5/10
U.S. Cl. 137—66
9 Claims

ABSTRACT OF THE DISCLOSURE

A safety gas valve of the type using a thermocouple, heated by a pilot burner, to energize a magnet that is adapted to hold a valve in its open position but is incapable of opening the valve. The valve is manually opened by a first plunger acting upon a pair of latch-together levers which operably engage the valve. A second manually operable plunger is arranged to unlatch the levers to permit the valve to be biased to its closed position. The parts are so arranged that the valve cannot again be moved to its open position until the magnet is deenergized. The safety valve controls gas flow not only to a main burner but to a pilot burner and a controller valve which, in turn, controls gas flow to a pressure operated valve in series with the safety valve. The first plunger operates an interrupter valve in series with the controller valve to prevent gas flow to the pressure operated valve during the resetting operation of the safety valve.

RELATED APPLICATIONS

This application is related to a corresponding German patent application Ser. No. P 17 78 129.2, with the same title and filed Mar. 30, 1968, the benefit of which date is claimed for this application. Another United States patent application, which is directed generally to similar subject matter, is Jan H. Van der Zee application No. 613,870, entitled Gas Valve With a Thermoelectric Safety Device, filed Feb. 3, 1967, and now Pat. No. 3,480,028.

BACKGROUND OF THE INVENTION

United States Patents 2,988,098 and 3,099,994 are also directed to valves for performing a generally similar function.

BRIEF SUMMARY OF THE INVENTION

A safety valve of the type requiring manual resetting of the valve and having means for manually closing the valve, wherein push-button rods are provided to perform the resetting and closing functions and wherein a latching mechanism, including a pair of levers, is provided to prevent immediate resetting of the valve following manual closing thereof.

DESCRIPTION OF THE DRAWING

FIG. 1 shows schematically a section through those parts of the gas valve combination, which are of interest in connection with the invention, with the elements being in the normal position, that is with the gas stream being shut off.

FIG. 2 shows the disengageable interlock connection in the operating position, that is when the safety valve is open and the power unit has pulled-in.

FIG. 3 shows the same elements when the interlock connection is disengaged either manually or because of exceeding temperature and the safety valve is closed but the power unit is still energized.

DESCRIPTION OF THE INVENTION

In the valve housing 1 of the gas valve combination, a well-known thermoelectric ignition safety device or power unit 2 is mounted, the armature 3 of which bears on a rod 4 and is pressed away from the magnet 7 of the power unit by means of a spring 5, which on the one side abuts against the housing of the power unit and on the other side against a spring plate 6. Furthermore, in the housing 1, two pushbuttons 11 and 12 are slidably guided and are biased by means of two reset springs 13 and 14, respectively, in the direction of their normal position. Both pushbutton rods 15 and 16 project into the internal space 17 of the housing which is gas-tight sealed against those spaces of the housing filled with gas means not shown.

Sitting on the valve seat 21 of the safety valve, is its closure member 22, the valve rod 23 of which is spring biased by means of a spring 24 in the valve open direction. Since the spring 5 of the power unit is stronger than the spring 24, the spring 5 simultaneously holds the valve 22 closed. The spring 24 abuts at one end against the housing and at the other end against a collar 25 on the valve rod 23.

Tiltable around a stationary axis 26, is a tilting lever 27, the lever arm 28 of which projects into the stroke area of the projection 18 of the pushbutton rod 16. The other lever arm 29 of the tilting lever 27 lies between the end of the armature rod 4 of the power unit and the end of the valve rod 23 of the safety valve. About the axis 26, there is also rotatable a second lever 31, which, by means of an interlock connection, is coupled to the lever 27. This interlock connection prevents the pressure spring 32, inserted between the two levers 27 and 31, from pressing the two levers apart. The interlock connection consists of a spring blade 33 with a hook 34 at its end. This hook 34 grips behind an edge 35 of the lever 31 as long as both levers are interlocked together. The lever 33 is either resilient or is linked flexibly to the lever 27 at the spot 36.

At the lower end of push-button rod 16, a closure member 40 for the valve controlling the gas stream to the main burner, is guided movably and is spring biased in closing direction by means of a spring 41. If the pushbutton 12 is pressed-in, the closure member 40 engages seat 42 and closes the gas flow to the main burner or to a servo system controlling the gas stream to the main burner. If the pushbutton 12 is pressed in further, the closure member remains in its closed position and the rod 16 slides through the valve 40 and enters the space 43. Simultaneously, the projection 18 engages the lever arm 28 of the tilting lever 27 and rotates this lever in a clockwise direction. Therewith, the lever 31 is rotated simultaneously, which via the interlock connection 33, 34, 35, is coupled to the lever 27. The lever arm 29 of the lever 27 presses the armature rod 4 of the power unit 2 upwardly and, therefore, the armature 3 against the magnet 7. The free end of lever 31 engages a recess 30 of the valve rod 23 and moves this valve rod in an upward direction, whereby the closure member 22 of the safety valve is lifted from seat 21. Now gas can enter from the gas inlet 44 via the safety valve and the channel 45 to the outlet 46 which leads to the pilot burner. The connection between the channel 47 and the space 43 is closed by means of the closure member 40. As soon as the pilot flame has heated the thermocouple of the ignition safety device sufficiently, the power unit holds the armature 3 in engagement with the magnet and holds the safety valve 22 open. Now the pushbutton 12 can be released to return under the influence of spring 14 into its normal position. The rods and levers now take the positions shown in FIG. 2. When the pushbutton 12 returns into its normal position the lower end of pushbutton rod 16 takes with it the closure member 40 in an upwardly direction so that now the connection between the passage 47 and the space 43 is established and gas can flow through outlet 48 to main burner or, via this outlet, to a servo system which opens a valve, which is situated between the passage 45 and the main burner.

If the pilot flame extinguishes, the power unit drops out after the thermocouple has cooled down sufficiently, whereby levers 27 and 31 are rotated under the influence of spring 5 into the positions shown in FIG. 1 and thereby close the safety valve 22. Spring 5 is stronger than spring 24.

Starting again from the position of the elements as shown in FIG. 2, in which the safety valve as well as the main burner valve is open, the gas stream can be closed manually by pressing off-button 11. The lower end of the pushbutton rod 15 thereby presses against hook 34 so that this hook slips away from the edge 35 and therewith disconnects the interlock connection between the levers 27 and 31. Spring 32 is now in a position to press the two levers 27 and 31 apart. The elements now take the positions as shown in FIG. 3, in which the power unit still draws the armature against the magnet. The spring 32, however, presses via lever 31 the valve rod 23 downwardly so that the safety valve 22' closes. The spring 32 is stronger than spring 24. With the safety valve being closed, the gas stream to the main burner as well as to the pilot burner is interrupted. Therefore, the thermocouple cools down and after a predetermined time period, the armature 3 of the power unit is no longer held against the magnet. The spring 5 now presses the armature and the armature rod 4 downwardly so that levers 27 and 31 again take the position as shown in FIG. 1, with hook 34 engaging behind edge 35 of lever 31. Spring 5 is stronger than spring 32. Now the elements again are in the normal position as shown in FIG. 1 and a new ignition trial can be started.

In the position as shown in FIG. 3 in which the safety valve is already closed but the power unit is still energized, no new ignition trial can be started because of the connection between the two levers 27 and 31 being interrupted. The projection 18 of the pushbutton rod 16 can not move the valve rod 23 of the safety valve. Not before the power unit drops out, can the two levers again come into engagement and a new ignition trial can be started.

An additional safety against inadmissible temperature increase within the housing can be achieved according to a modification of the invention by making the arm 33 of the hook 34 of bimetal material. If an inadmissible temperature increase appears, the bimetal bends into a form as shown in FIG. 3, so that the interlock connection between the levers 27 and 31 is interrupted and the safety valve 22 is closed by the force of the spring 32. When the temperature in the housing decreases to the normal value, hook 34 again accepts the flat form as shown in FIG. 2 and engages behind the edge 35 of lever 31. Then the interlock connection between the two levers is re-established.

The embodiments of the invention in which an exclusive property or right is claimed are defined as follows:

1. A gas valve which has a gas passageway leading from a gas inlet to a gas outlet, a safety valve 22 which is operably connected to and movable in response to tilting motion of a first lever 31 to open and close the passageway, a second lever 27 with which the first lever is normally constrained by a latch means 33–35 for joint tilting motion to and from an open position and a closed position, means 32 for biasing said levers apart, first control means 12, 16 and 18 which is operable to tilt the second lever and the first lever when the latch means is engaged to open said safety valve, means 5 tending to tilt said levers when the latch means is engaged to close said safety valve, an ignition safety means 2 which is operable in response to a flame to restrain the means tending to tilt the levers from moving said levers once the safety valve is in the open position and a flame is present, and second control means which is operable to release the latch means, the arrangement being such that release of the latch means while the said ignition safety means remains operable causes the first lever alone to tilt to close said safety valve under the influence of said means for biasing said levers apart so that re-opening of the passage is dependent upon prior re-engagement of the latch means.

2. A gas valve according to claim 1, wherein the second lever 27 and the first lever 31 operating the safety valve 22 are tiltable around a common axis 26.

3. A gas valve according to claim 2, wherein the latch means includes an interlock hook 33, 34 which is borne by one lever 27 and engages behind an edge 35 of the other lever 31.

4. A gas valve according to claim 3, wherein the interlock hook 33, 34 is resiliently supported.

5. A gas valve according to claim 1, wherein the latch means 33, 34, 35 includes a temperature sensitive member 33 which disengages the latch means if the temperature exceeds a predetermined temperature.

6. A gas valve according to claim 5, wherein the member 33 of the latch means 33, 34 is borne by a lever 27 and is a bimetal member.

7. A gas valve as defined in claim 1, wherein said first and second control means are operated by pushbuttons.

8. A gas valve as defined in claim 1, in combination with main valve means in said passageway between said safety valve and said outlet and located with respect to said first control means so as to be closed thereby only while the first control means is being operated to open said safety valve.

9. A gas valve as defined in claim 8, wherein said gas valve has an outlet from said passageway between said safety valve and said main valve means for connection to a pilot burner.

References Cited

UNITED STATES PATENTS 2,988,098   6/1961   Thomas _____ 251—67X
3,480,028   11/1969  Van der Zee _____ 137—66

WILLIAM F. O'DEA, Primary Examiner

R. GERARD, Assistant Examiner

U.S. Cl. X.R.

431—54